United States Patent

Li et al.

[11] Patent Number: 5,757,771
[45] Date of Patent: May 26, 1998

[54] QUEUE MANAGEMENT TO SERVE VARIABLE AND CONSTANT BIT RATE TRAFFIC AT MULTIPLE QUALITY OF SERVICE LEVELS IN A ATM SWITCH

[75] Inventors: Kwok-Leung Li, Silver Spring; Yung-Lung Ho, Rockville, both of Md.

[73] Assignee: Yurie Systems, Inc., Landover, Md.

[21] Appl. No.: 557,302

[22] Filed: Nov. 14, 1995

[51] Int. Cl.$^6$ ................................................. H04L 12/56
[52] U.S. Cl. ......................................... 370/235; 370/418
[58] Field of Search .................................. 370/389, 395, 370/398, 399, 412, 414, 416, 418, 422, 462, 235, 394

[56] References Cited

U.S. PATENT DOCUMENTS

| | | | |
|---|---|---|---|
| 5,083,269 | 1/1992 | Syobatake et al. | 395/425 |
| 5,150,358 | 9/1992 | Punj et al. | 370/418 |
| 5,233,606 | 8/1993 | Pashan et al. | 370/418 |
| 5,278,828 | 1/1994 | Chao | 370/394 |
| 5,303,078 | 4/1994 | Brackett et al. | 359/139 |
| 5,365,519 | 11/1994 | Kozaki et al. | 370/378 |
| 5,463,620 | 10/1995 | Sriram | 370/412 |
| 5,475,680 | 12/1995 | Turner | 370/412 |
| 5,521,916 | 5/1996 | Choudhury et al. | 370/414 |
| 5,541,912 | 7/1996 | Choudhury et al. | 370/412 |
| 5,555,265 | 9/1996 | Kakuma et al. | 370/395 |

FOREIGN PATENT DOCUMENTS 9104624  4/1991  WIPO.

OTHER PUBLICATIONS

Congestion Control Schemes in Prioritized ATM Networks, Yegani et al., IEEE Int'l Conf. on Comms., vol. 2 (May 1–5, 1994) pp. 1169–1173.

Queue Management with Multiple Delay and Loss Priorities for ATM Switches, Chao et al., IEEE Int'l Conf. on Comms., vol. 2 (May 1–5, 1994) pp. 1184–1189.

A Shared Buffer Memory Switch for an ATM Exchange, Kuwahara et al., IEEE Int'l Conf. on Comms., vol. 1 (Jun. 11–14, 1989) pp. 118–122.

*Primary Examiner*—Hassan Kizou
*Attorney, Agent, or Firm*—Sixbey, Friedman, Leedom & Ferguson; Daniel W. Sixbey; Eric J. Robinson

[57] ABSTRACT

A buffer management system and method for use in an ATM switch that allows for data processing of variable bit rate (VBR) and constant bit rate (CBR) traffic using a common buffer memory. The buffer memory is broken down into data sub-queues, each of which is assigned an output and purge priority. ATM cells are allocated to a particular data sub-queue by matching the desired quality-of-service of the cells with the output and purge characteristics of each sub-queue. The system and method dynamically sizes the data sub-queues so as to be equal to the number of ATM cells in the data sub-queue. In addition, age and size ratio thresholds may be assigned to each data sub-queue to better distribute available bandwidth among the sub-queues, and to ensure that cells are not excessively delayed.

29 Claims, 6 Drawing Sheets

QUEUE MANAGEMENT TO SERVE VARIABLE AND CONSTANT BIT RATE TRAFFIC AT MULTIPLE QUALITY OF SERVICE LEVELS IN A ATM SWITCH

TECHNICAL FIELD OF THE INVENTION

The present invention relates generally to the packet-switching data systems such as ATM systems and more particularly to a method and apparatus for controlling the flow of constant bit rate (CBR) and variable bit rate (VBR) traffic in an ATM switch.

BACKGROUND OF THE INVENTION

It is generally recognized that Asynchronous Transfer Mode, or ATM, is the communications network technology of choice for the future. One reason this is so is ATM's ability to support a variety of traffic (for example, voice, data, video, etc.) over a broad range of transmission rates and mediums. Traditionally, voice and data traffic for example, have been carried on separate networks due to the great differences in their transmission requirements. Voice traffic generally has a constant bit rate, or CBR, and can tolerate some data losses, but is more sensitive to transmission delay. In contrast, data traffic generally has a variable bit rate, or VBR, and has a low tolerance for data loss, but is less sensitive to transmission delay.

To support both types of traffic, ATM communication networks employ fixed-size cells of 53-bytes as basic traffic units, which permits rapid switching and facilitates traffic mixing. Each cell carries connection identifiers that enables the network to properly route the cells to their respective destination. These features, coupled with its asynchronous nature, allow ATM to readily accommodate both the regular intervals of CBR traffic and bursts of VBR traffic.

To maximize network utilization while preserving the flexibility of ATM, effective traffic management is crucial. It is preferable, for efficient resource allocation, to be able to provide multiple levels and types of services (or quality-of-service levels, QoS) to different users usually depending on costs. Typically, a QoS is associated with each connection established during call setup and depends on the contractual agreement with the user for service. The QoS specifies the type of traffic and the expected performance (e.g., delay, loss ratio) for the connection. The communication network's ability to support different QoS levels, however, depends greatly on the design of the network switches and the connection's traffic type.

To reduce the potential of having to discard cells during VBR traffic bursts and other congestion causing situations, a queue or buffer is typically employed to temporarily store incoming cells as required. After entering the queue, an ATM cell awaits its turn to be dispatched. The order of dispatched is determined by the QoS of its connection. Buffer management, which is needed to accommodate different input and output traffic patterns, is a key component to determining deliverable services. Two primary considerations in buffer management are the order of cell output and, in the event of congestion, the order of cell purging from the buffer to alleviate congestion (i.e. congestion control). Balancing of these considerations, however, is not simple; each buffer may serve multiple connections of both data and voice traffic each having differing importance levels. Furthermore, whichever buffer control scheme is used, it must operate efficiently at high speed.

To provide multiple Qos levels, conventional buffer management schemes have traditionally relied upon a single priority scheme. In such a scheme, a connection is assigned a priority that is used to determine either a cells output ordering or its congestion purge ordering. For Example, U.S. Pat. No. 5,150,358 to Punj et al. discloses a method and apparatus for transmitting constant and variable bit rate traffic in which a priority controls a cells output ordering, while U.S. Pat. No. 5,233,606 to Pashan et al. discloses an ATM switching module in which a priority controls a cells purge ranking. The deficiency in such an approach is that a single priority cannot simultaneously accommodate both CBR and VBR traffic since CBR cells should be transferred ahead of VBR cells (thus implying a higher priority for CBR cells) while tolerating higher losses (thus implying a lower priority).

To solve the above deficiency, what is needed is two sets of priorities—one set for purging and another set for controlling output. Basically, the combination of these two sets of priorities defines a class of service. Such a system is discussed in an article entitled *Queue Management with Multiple Delay and Loss Priorities for ATM Switches* by Chao et al. and published in the IEEE Int'l Conf. on Comms., Vol. 2 (May 1-5, 1994) pp. 1184-1189. Chao et al. disclose a method that uses two sequencers to simultaneously order the cells for transmission and purging. The delay priority sequencer sorts the cells such that cells with higher delay priorities are transmitted earlier. Similarly, the loss priority sequencer sorts the cells so that low loss priority cells are purged earlier. Such a cell sorting method, however, is time consuming. Thus, only simple ordering algorithms can be implemented and the buffer size may be limited.

Another system that considers both delay and loss is discussed in *Congestion Control Schemes in Prioritized ATM Networks* by Yegani et al. and published in the IEEE Int'l Conf. on Comms., Vol. 2 (May 1-5, 1994) pp. 1169-1173. Yegani et al. propose a method using separate buffers for VBR and CBR traffic. Cells in the CBR buffer are transmitted ahead of cells in the VBR buffer. The buffers implement independent congestion control strategies. This approach, however, does not utilize buffer memory efficiently. That is, either the VBR or CBR buffer may discard cells due to congestion while the other buffer still has ample capacity. Moreover, delay prioritization of the cells in the CBR buffer was not considered. Thus, under normal operation where no cells are purged, there is no QoS differentiation between CBR cells.

Yet another approach that considers a plurality of service classes is discussed in an article entitled *A Shared Buffer Memory Switch for an ATM Exchange* by Kuwahara et al. and published in the IEEE Int'l Conf. on Comms., Vol. 1 (Jun. 11-14, 1989) pp. 118-122. Kuwahara et al. describe a shared buffer memory architecture where multiple outputs share a buffer for efficient memory utilization. To accommodate multiple service classes, the buffer is further fragmented into queues, one per service class per output port. It is suggested by Kuwahara et al. that for some service classes, the length of the queue may be restricted. This method, again, may limit capacity utilization since cells from some queues may be dropped while buffer capacity is still available. In addition, there is no consideration by Kuwahara et al. of an overall congestion control scheme for the buffer as a whole, which is necessary since the buffer is shared by all classes of traffic.

SUMMARY OF THE INVENTION

In order to overcome the deficiencies noted above, the present invention provides a system and method of buffer management in an ATM switch that implements simultaneous delay and purge prioritization in a manner that maximizes buffer utilization and is computationally efficient. In accordance with a preferred embodiment of the present invention, a shared memory buffer architecture is employed in which multiple outputs share a single buffer that is divided into a plurality of data sub-queues—one for each combination of service class and output port—whose capacities are dynamically allocated to maximize buffer utilization. Furthermore, in accordance with the present invention, independent, but simultaneously operating, algorithms are used to determine the order of queue output and purging in which the queues (instead of the cells) are ordered for output and for purging to limit computational effort.

It is an object of the present invention to provide a system and method for buffer management in an ATM switch that implements simultaneous output and purge ranking prioritization for different classes of service, such as constant bit rate and variable bit rate traffic, in a manner that maximizes buffer capacity utilization and is computationally efficient.

It is another object of the present invention to provide a system and method for buffer management for an ATM transmission system that provides efficient management of different data inputs having diverse QoS requirements.

It is another object of the present invention to provide a system and method for efficient buffer management of various classes of service using multiple prioritization schemes.

It is a further object of the present invention to provide a system and method for providing buffer management for an ATM switch that implements output and purge ranking prioritization for variable bit rate and constant bit rate traffic so as to allow both types of traffic to utilize the same buffer in an efficient manner.

It is yet another object of the present invention to provide a system and method for providing a buffer management for an ATM switch that prioritizes the output and purging of data sub-queues, which carry the ATM cells of different data inputs, so as to allow the multiple data inputs to use the same buffer without detrimental effects to particular lower ranking data sub-queues.

It is a further object of the present invention to provide a system and method for buffer management for an ATM switch to better control bandwidth allocation.

It is another object of the present invention to provide a system and method for a buffer management that allows greater certainty to network users in terms of bandwidth allocation.

It is another object of the present invention to provide a system and method for buffer management in an ATM switch for meeting the transmission requirements of diverse classes of service, using a single buffer memory.

It is a further object of the present invention to provide a system and method for buffer management to efficiently control bandwidth allocation such that different data sub-queues, of different classes of service have their transmission requirements met without unduly burdening other data sub-queues of the same class of service and other classes of service.

It is a yet another object of the present invention to provide a system and method for buffer management of an ATM communications network for controlling output bandwidth allocation for both variable bit rate and constant bit rate traffic through the same buffer so as to meet the diverse transmission requirements between the different types of traffic without detrimental interference between each type.

It is still another object of the present invention to provide a system and method for buffer management for efficiently allocating a minimum bandwidth for data sub-queues that have been preempted by other data sub-queues for prolonged periods of time, so that network users have greater certainty of the allocation of bandwidth to them.

It is yet another object of the present invention to provide a system and method for buffer management for an ATM switch that includes dynamically setting the length of queues of the different input data of the classes of service so as to maximize the use of the buffer memory at all times.

In order to achieve the above-mentioned objects, and other objects that will become apparent from the description of the invention, a buffer management system and method according to a first preferred embodiment of the present invention includes a single buffer leading to one or more outputs. The buffer memory is divided into data sub-queues, each data sub-queue containing ATM cells or other fixed-size digital data packets of a class of service, such as data or voice traffic, and having certain priority levels in terms of output and purging, wherein the length of the data sub-queue is dynamically apportioned to be equal to the length necessary to hold the cells of that particular type of data input at any particular time. Each data sub-queue is simultaneously given prioritization rankings, including output and purge rankings, so that data sub-queues having higher output rankings are sent out before data sub-queues having a lower output ranking. In addition, data sub-queues having lower priority purge rankings are purged before data sub-queues with higher priority purge rankings.

In accordance with a second embodiment of the present invention, a buffer management system and method provides each of the data sub-queues with a minimum bandwidth so that lower level data sub-queues are not continuously preempted by higher level data sub-queues in terms of output. In this embodiment, a method is provided for ensuring output of ATM cells from data sub-queues that have been waiting to send cells for some determined period of time. A delay threshold is specified for each data sub-queue so that if a non-empty data sub-queue has aged beyond this delay threshold, a dispatch-essential flag is raised indicating that the data sub-queue must be serviced before any non-dispatch-essential data sub-queues. A predetermined number of cells must then be dispatched before the dispatch-essential flag is lowered.

In yet another embodiment of the present invention, a buffer management system and method allocates bandwidth efficiently among different priority data sub-queues so as to balance the different loads on the transmission network. Each data sub-queue is assigned an accumulation ratio. When ATM cells from data sub-queues are outputted, the highest output ranking data sub-queue having at least a minimum number of waiting cells, equal to the product of the accumulation ratio and the total number of cells in the buffer, has its ATM cells sent first. The accumulation ratio are set such that at least one non-empty data sub-queue will have at least the minimum number of waiting ATM cells.

DETAILED DESCRIPTION OF THE PREFERRED EMBODIMENTS

Figure 1:
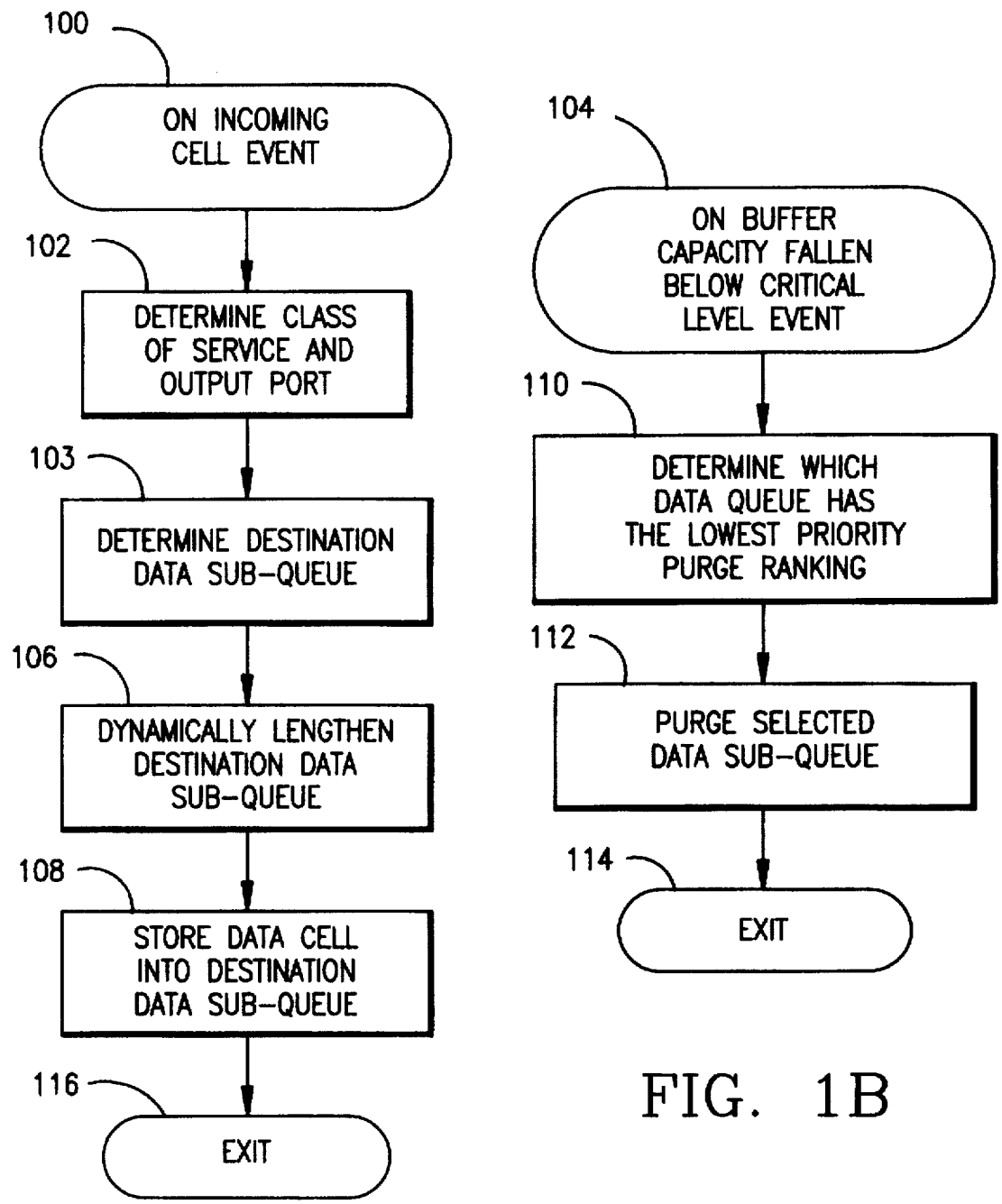
FIG. 1A illustrates a method for carrying out the inputting of traffic in accordance with a first embodiment of the present invention.
FIG. 1B illustrates a method for carrying out the purging of traffic in accordance with a first embodiment of the present invention.

As described above, in a first preferred embodiment of the invention, a buffer management system and method according to the present invention includes a single buffer having one or more outputs. The buffer memory is divided into a plurality of data sub-queues, each data sub-queue containing ATM cells or other fixed-size digital data packets of a class of service, such as data or voice traffic, wherein the length of the data sub-queue is dynamically apportioned to be equal to the length necessary to hold the cells of that particular type of data input at any particular time. Each data sub-queue is simultaneously given prioritization rankings, including output and purge rankings, so that data sub-queues having higher output rankings are sent out before data sub-queues having a lower output ranking. In addition, in the event of buffer congestion, data sub-queues having lower priority purge rankings are purged before data sub-queues with higher priority purge rankings.

An example of how the output and purge rankings operate in this first preferred embodiment of the present invention is discussed in connection with Table 1, in which a buffer memory includes four data sub-queues with the indicated output and purge rankings for each data sub-queue as service class parameters.

TABLE 1

| Queue   | Output Ranking | Purge Ranking |
|---------|----------------|---------------|
| 1 (CBR) | 4              | 3             |
| 2 (CBR) | 3              | 4             |
| 3 (VBR) | 2              | 1             |
| 4 (VBR) | 1              | 2             |

In this example data sub-queues 1 and 2 are designated for CBR traffic and data sub-queues 3 and 4 are designated for VBR traffic. It should be noted that while this example uses a nominal number of data sub-queues, which is done merely for illustration purposes, in an actual ATM switch in accordance with the present invention, any number of data sub-queues can be present. The table also provides arbitrary variables for the output and purge rankings of each data sub-queue, and other values can be assigned as desired.

It is noted that generally, CBR traffic will have higher value output rankings than the VBR traffic (representing the need for CBR traffic to be forwarded sooner, thus avoiding transmission delay), but will have lower priority purge rankings than VBR traffic (representing the desirability of avoiding purging of the VBR traffic, if possible). Because CBR traffic normally has higher output priority than VBR traffic, data sub-queues 1 and 2 have been given higher output ranking in this example. By contrast, because CBR traffic is more loss tolerant than VBR traffic, data sub-queues 3 and 4 are given higher priority purge rankings (lower values for the purge ranking), so that ATM cells from the VBR traffic data sub-queues are purged last.

In this example, when it is desired to output a cell from the buffer memory, data sub-queue 1 will have its ATM cells transmitted to the output first because of its highest value output ranking. Next to output ATM cells (in the event that data sub-queue 1 is empty) will be data sub-queue 2, and so on.

In accordance with the present invention, as ATM cells are transmitted from the data sub-queues, the data sub-queue from which an ATM cell was just transmitted will dynamically change size so as to be exactly equal to the length necessary to hold the remaining ATM cells in the data sub-queue. In this manner, the total buffer memory capacity is efficiently allocated to the data sub-queue on an as-needed basis.

Since incoming traffic can occur in high speed bursts, cells need to be purged before all buffer memory is filled to make room for potential high priority traffic burst. This should be done in stages such that a single sub-queue may be purged as buffer capacity falls below one threshold, while multiple sub-queues are purged if capacity falls further to a more critical level. For the scope of this invention, it suffices to discuss only the less critical situation which requires only one sub-queue to be purged. Again, for computational efficiency, purging is carried out on a queue-by-queue basis and not cell-by-cell. When the buffer memory falls below a certain threshold and it becomes necessary to purge ATM cells, data sub-queue 2 will be purged first because it has the highest value purge ranking, corresponding to the lowest priority for purging. If data sub-queue 2 becomes empty, then sub-queue 1 will be purged followed by data sub-queue 4 and data sub-queue 3.

Figure 2:
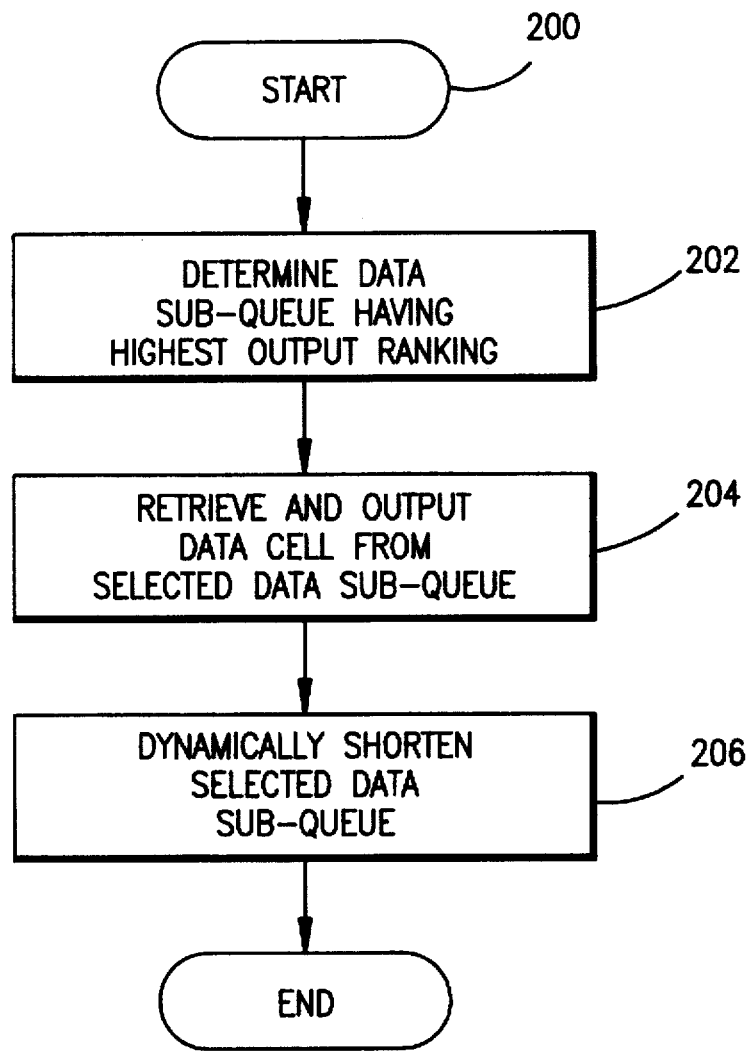
FIG. 2 illustrates a method for carrying out the outputting of traffic in accordance with the first embodiment of the present invention.

Having generally described the operation of the present invention in accordance with a first preferred embodiment, a method for performing this operation is described in more detail in connection with FIGS. 1A, 1B, and 2. FIG. 1A illustrates a method for receiving and storing a data cell into a desired data sub-queue of a buffer memory in accordance with the present invention. FIG. 1B illustrates a method for purging data sub-queues when the memory gets full, and FIG. 2 illustrates a method for selecting and outputting a data cell in accordance with this first embodiment of the present invention.

As shown in FIG. 1A, the process begins in block 100, when a data cell, such as an ATM data cell, is received by the ATM switch and destined for storage into a buffer memory of the ATM switch. In block 102, the class of service and selected output port for the incoming ATM data cell is determined. As noted above, the buffer memory of the ATM switch is divided into a plurality of data sub-queues for each combination of class of service and output port. Accordingly, this information is used in block 103 to determine a destination data sub-queue in which the incoming cell will be temporarily stored. If the buffer memory has space for the incoming ATM cell, then at block 106, the destination data sub-queue to which the incoming ATM cell will go is dynamically expanded in length so that it can store this additional ATM cell.

It is to be understood that the data sub-queue is expanded just enough to store the additional ATM cell. In this manner, it is to be understood that each data sub-queue has only the length necessary to hold the exact number of ATM cells allocated to that data sub-queue. Therefore, purging is only necessary when the plurality of data sub-queues have expanded in size to fill a large fraction of the buffer memory. This is in contrast to a buffer memory consisting of predetermined fixed size data queues. In that case, the space allocated to a particular data queue may be full and cells will have to be purged from that data queue to make room for the incoming cell, even though other data queues have ample space to store additional cells. Finally, in block 108, the ATM cell is stored into the destination data sub-queue, and the process ends at block 116.

In the event that the buffer memory is determined to be full, then a purging function must be performed to make room for the incoming data cell, which is shown in FIG. 1B. In the most preferred embodiment, the process of FIG. 1B is performed when it is determined that the buffer capacity has fallen below a critical level and the processes of FIGS. 1A and 1B could be contemporaneously performed by the present invention. Control transfers to block 110, where a determination is made of which data sub-queue has the lowest priority purge ranking. Once determining which data sub-queue has the lowest priority purging ranking, the entire data sub-queue is purged in block 112. This process ends at block 114 and as a result of additional storage capacity resulting from the purging of the data sub-queue, the incoming cell can be stored as provided by the inputting method as described above in relation with FIG. 1A.

As is readily apparent from the above description, the present invention as described in this first preferred embodiment allows for efficient usage of the buffer memory. By dividing the buffer memory into a plurality of data sub-queues (each corresponding to a class of service and output port and each having unique output and purge priorities) that have lengths that are dynamically controlled by the ATM switch, data cell purging does not occur unless the entire buffer memory reaches a critical stage. Thus, in accordance with this embodiment of the present invention, efficient memory utilization is achieved.

Referring next to FIG. 2, a method for selecting and outputting a data cell from a buffer memory of an ATM switch in accordance with this first embodiment of the present invention is illustrated. The method begins in block 200 when it is determined that an ATM data cell is to be provided to an output port. Control is then passed to block 202, where the system determines which data sub-queue will provide the data cell to be output to an output circuit. In this embodiment of the present invention, this decision involves simply determining which of the data sub-queues has the highest output ranking. In this respect, it is to be noted that normally data sub-queues holding CBR traffic will have higher output rankings than data sub-queues carrying VBR traffic, because CBR traffic does not tolerate delay in transmission of data cells through the communications network, and thus through the ATM switch.

Once the data sub-queue having the highest output ranking is determined, control passes to block 204 and the ATM cell is dispatched from the selected data sub-queue and transmitted to an appropriate output circuit to its assigned output port. However, the size of the selected data sub-queue now exceeds the size necessary to hold the remaining ATM data cells. Therefore, at block 206, the data sub-queue from which the ATM data cell was transmitted is shortened in length such that the size of the data sub-queue once again becomes the exact length for storing the ATM data cells that are still held in that data sub-queue. Thus, this portion of the buffer memory again becomes free for use by any data sub-queue on a first come basis as described above in connection with FIG. 1.

As noted above, this embodiment of the present invention dynamically changes the length of each of the data sub-queues so that the size of the data sub-queue is equal to the length necessary to hold the number of ATM cells assigned to each of the data sub-queues. This step provides many advantages. First, no unnecessary space is allocated to data sub-queues, which wastes valuable buffer memory space that could be used by other data sub-queues. For instance, if some x length was dedicated for a given data sub-queue, but the amount of cells in the data sub-queue only needed a space of y (less than x) to hold them, then the difference (x−y) would be the amount of space in the data sub-queue that was being wasted, while another data sub-queue had reached its capacity and was having to purge cells.

Therefore, this dynamic allocation maximizes the use of the buffer memory. In addition, this dynamic allocation allows different classes of service to affect one another such that if one class of service has higher priority purge rankings, more space can be dynamically allocated as needed in the buffer memory for such data sub-queues relative to other data sub-queues which have lower priority purge rankings. Therefore, the buffer memory space is utilized in a very efficient manner.

In addition, as noted above, the present method employs a double priority scheme. This permits tailoring the transmission network to more efficiently meet the transmission requirements of different classes of service. For example, if VBR and CBR traffic is transmitted through the ATM switch, each class of service has its specific transmission needs. The transmission requirements for VBR traffic are such that the traffic requires minimum data loss, while the speed at which the traffic is sent is a relatively less important consideration. For CBR traffic, the transmission requirements are such that normally, there should be no delay in outputting the traffic from the data sub-queues. By contrast, CBR traffic has less critical requirements with regards to losses compared to VBR traffic. When cells are output from the buffer memory, the CBR traffic will normally have a higher priority than VBR traffic, and will thus be output first. On the other hand, when the buffer memory becomes critical and it becomes necessary to purge cells, the CBR traffic may be purged before the VBR traffic because of the higher priority for purging of the VBR traffic. Therefore, this double priority scheme, using both output and purge ranking, allows the ATM switch to efficiently meet the transmission needs of both classes of service without having to sacrifice meeting one requirement over another.

Furthermore, having dynamic allocation and a double priority scheme together has further advantages. Dynamic allocation allows the total buffer memory to become critical before having to purge any cells, which minimizes the number of ATM cells that must be purged. In addition, the purging function purges cells from the lowest priority data sub-queue in the whole buffer memory rather than purging cells from fixed size data sub-queues that become full, while other data sub-queues are not full. Therefore, the purging function is performed in a very efficient manner.

It should be noted that the mere provision of differing output and purge rankings alone is insufficient to result in this efficient use of buffer memory. It is further necessary to provide, as in the present invention, the ability to dynamically allocate buffer memory to each data sub-queue. That is, if data sub-queues have a fixed length, then the provision of purge rankings is not necessary since a given data sub-queue will be purged only when there is a data overflow condition with respect to that data sub-queue. The status of other data sub-queues will have no effect on the decision to purge with respect to any given data sub-queue. Therefore, the combination of different output/purge rankings and dynamic data sub-queue allocation in accordance with the present invention is particularly advantageous.

It is further particularly noted in the above method that the queues are assigned output rankings and purge rankings rather than assigning each individual ATM cell output and purge rankings. Sorting the ATM cells becomes very complicated and time consuming task when many ATM cells are incoming into the buffer memory. Furthermore, this time consuming sorting is furthermore unnecessary because ATM cells having similar service requirements in terms of class of service and particular output do not need to be handled separately. Therefore, allocating these ATM cells into one data sub-queue and then performing the necessary ordering on the data sub-queues saves valuable time and costs without any detriment to the precision of the output and purge rankings of the ATM cells.

A second preferred embodiment of the present invention includes a buffer management system and method that provides each of the data sub-queues with a minimum bandwidth so that data sub-queues having a lower level of output priority are not continuously preempted by data sub-queues having higher output priorities. The basic output algorithm described above in connection with FIG. 2 will result in a VBR data sub-queue with a higher output ranking always preempting a lower ranked VBR data sub-queue. Thus, as long as VBR traffic continues to flow to a data sub-queue having a higher output ranking, data sub queues having lower output rankings will never have their data cells dispatched. Such a situation, however, is clearly undesirable since most network users will require more certainty of the bandwidth allocated to them.

It is also noted that CBR traffic is excluded from this consideration, as discussed below, since its output bandwidth is essentially equal to its input bandwidth and as a result of this predictable bandwidth requirement, additional bandwidth capacity for VBR traffic can be ensured. That is, this aspect of the present invention is used to allocate remaining bandwidth between all VBR data sub-queues after CBR requirements are met.

In this embodiment, a method is provided for ensuring output of ATM cells from data sub-queues that have been waiting to output a cell for some determined period of time, thereby ensuring a minimum bandwidth to that data sub-queue. Specifically, a delay threshold is specified as a service class parameter for each data sub-queue so that if a non-empty data sub-queue has aged beyond this delay threshold, a dispatch-essential flag is raised indicating that the data sub-queue must be serviced before any non-dispatch-essential data sub-queues. A predetermined number of cells must then be dispatched before the dispatch-essential flag is lowered.

The delay threshold represents a maximum predetermined amount of time, represented as a number of ATM cells, that a given data sub-queue will wait between transmissions of ATM cells to the output circuit. When a data sub-queue has not sent any ATM cells, while the other data sub-queues in the buffer memory have collectively sent a number of ATM cells equal to this delay threshold, the particular data sub-queue is said to become dispatch-essential.

When a data sub-queue becomes dispatch-essential, a dispatch-essential flag is raised for that data sub-queue which signals that a predetermined number of ATM cells must be sent from this data sub-queue before the dispatch-essential flag is lowered. The predetermined number of ATM cells that must be dispatched can be monitored by a dispatch counter. If a dispatch-essential flag is raised, the dispatch counter is initialized to equal the number of ATM cells that this data sub-queue must transmit before the dispatch-essential flag is lowered. Each time an ATM cell is transmitted from the corresponding dispatch-essential data sub-queue, the dispatch counter is decremented by one until its reaches zero (or any other desired value). This means that the required predetermined number of ATM cells have been transmitted to the output circuit, and the dispatch-essential flag is lowered and counters reset. It is also noted that the dispatch counter could be eliminated to simplify the system (although with some loss of flexibility) and the dispatch-essential flag cleared and counters reset after a single cell is dispatched from a dispatch-essential data sub-queue.

In order to monitor how long any particular data sub-queue has been waiting to transmit any of its ATM cells to the output circuit, a queue age counter, initially set to zero (or some other desired value), is incremented for each data sub-queue each time an ATM cell from one of the other data sub-queues in the buffer memory is transmitted to the output circuit.

An example of how the delay threshold works in accordance with this second preferred embodiment of the present invention will now be explained in connection with Table 2. If the same four queue structure as discussed above is used, then Table 2 shown below is the same as Table 1 except for the addition of service class parameters $T_d$ and $N_d$.

TABLE 2

| Queue | Output Ranking | Purge Ranking | Delay Threshold $T_d$ | $N_d$ |
|---|---|---|---|---|
| 1 (CBR) | 4 | 3 | 0 | 1 |
| 2 (CBR) | 3 | 4 | 0 | 1 |
| 3 (VBR) | 2 | 1 | 4 | 1 |
| 4 (VBR) | 1 | 2 | 8 | 1 |

As in the first preferred embodiment, data sub-queues 1 and 2 are designated for CBR traffic and data sub-queues 3 and 4 are designated for VBR traffic. In this example, it is first noted that the values used for parameters $T_d$ and $N_d$ are arbitrary and any values can be used depending on the bandwidth requirements of each of the data sub-queues, but with a limitation on the total bandwidth apportioned, discussed in detail below.

If data sub-queue 3 has been waiting to output an ATM cell while the other data sub-queues (i.e. data sub-queues 1, 2 and 4 in this example) have been outputting ATM cells, then once four ATM cells have been transmitted from these other data sub-queues, the dispatch-essential flag for data sub-queue 3 is raised. Thereafter, assuming data sub-queue 3 is the only queue with a dispatch-essential flag raised, an ATM cell will be transmitted from data sub-queue 3 and the dispatch-essential flag will be cleared.

As can be seen, in this example, that the maximum period between the starting of successive transmissions of ATM cells from queue 3 is approximately four cell counts for waiting and one cell count sending an ATM cell, which is $T_d+N_d$. In addition, in this example, one ATM cell is transmitted from data sub-queue 3 for every five ATM cells transmitted from other data sub-queues.

In this embodiment, it is understood that if the delay threshold is represented by $T_d$ and the predetermined number of ATM cells that must be sent before the dispatch-essential flag is lowered is $N_d$, then the maximum period between the starting points of transmitting ATM cells from the data sub-queue will be roughly equal to $T_d+N_d$. In addition, a fraction of the total bandwidth assigned to the data sub-queue will be roughly equal to $N_d/(T_d+N_d)$ Further observations can be made from this simplified example. For one, it should be noted that $T_d$ for the CBR traffic was chosen as zero. This means that the maximum period between output is equal to 1 (using $T_d+N_d$) and the bandwidth formula reduces to $N_d/N_d$, or one. That is, the output bandwidth is equal to the input bandwidth. This indicates that the choice for $T_d$ must take into account how much bandwidth is to be apportioned for each of the data sub-queues.

In addition, it should be noted that the total of the apportioned fraction of bandwidths can be greater than one, though not substantially greater than one. The reason for allowing the total apportioned bandwidth to be greater than one is because of the unlikelihood that all the data sub-queues will transmit their ATM cells simultaneously. However, apportioning the bandwidths so that the total of the fractions is substantially greater than one will result in a greater likelihood that many data sub-queues will want to use their allocated bandwidth simultaneously.

Furthermore, as noted above, this method allows for assuring each data sub-queue some minimum bandwidth, which may be measured as some number of data cells per unit of time. Without this method, certain users on a network may be continuously preempted by other users who have higher output priority. In such situations, with the present method, these preempted users may not be able to use the network for long periods of time. This method alleviates this problem by providing each user with a minimum bandwidth. In addition, this method provides a network provider with better control over how much bandwidth each user can be expected to have, allowing the network provider to better guarantee a certain level of service for a user.

A further advantage of this embodiment is that it effectively utilizes the fact that not all data sub-queues use their apportioned bandwidth simultaneously. By allocating fractions of the bandwidth for the data sub-queues in such a way that the total is greater than one, the output bandwidth is effectively utilized. Therefore, the overall efficiency of the method of buffer management is exceptional.

Figure 3:
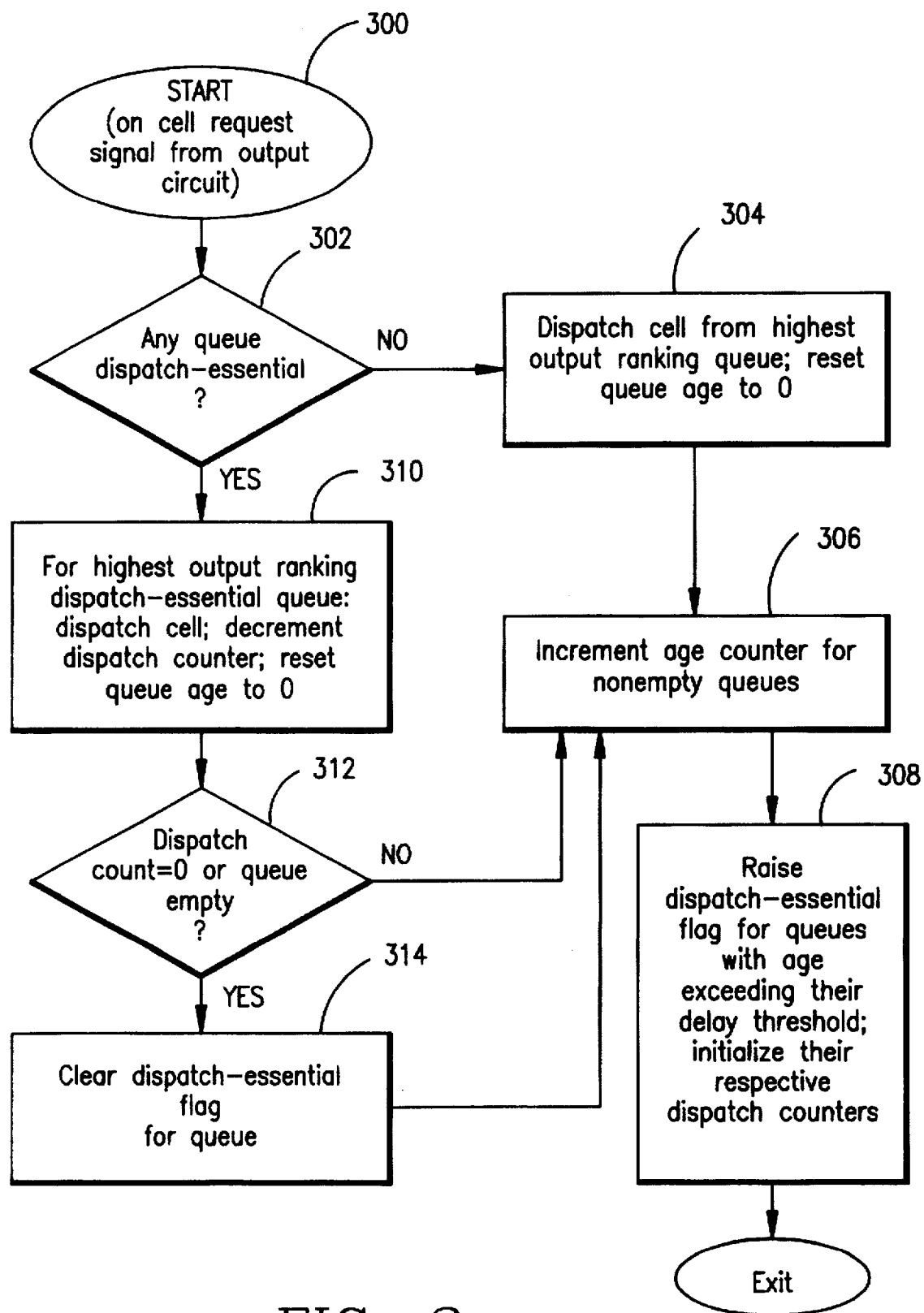
FIG. 3 illustrates a method for carrying out a second embodiment of the present invention.

FIG. 3 illustrates one method for carrying out this second preferred embodiment of the present invention. In block 300, a cell request is received from the output circuit for an ATM cell. This means that the output circuit is ready to receive an ATM cell from the buffer memory. In the next step, at block 302, a determination is made as to whether any of the data sub-queues have reached their delay threshold, and therefore have become dispatch-essential. This determination could be made, for example, by checking the dispatch-essential flags for the data sub-queues to see if any flags have been raised.

If no dispatch-essential flags have been raised, then no data sub-queues are dispatch-essential. In this case, control transfers to block 304, and an ATM data cell is transmitted from the data sub-queue having the highest output ranking to the output circuit, just as in the first preferred embodiment of the present invention discussed above in connection with FIG. 2. Although not shown in FIG. 3, this step also involves dynamically shortening the length of the data sub-queue from which the ATM cell was transmitted so that the size of the data sub-queue is once again equal to the total length of the remaining ATM cells in the data sub-queue, as shown in FIG. 2 at block 206. In addition, in block 304, the queue age counter for this data sub-queue is reset to zero, representing that no ATM cells have been transmitted from other data sub-queues since the previous transmission from this data sub-queue.

Next, continuing with the case where no data sub-queues have their dispatch-essential flag raised at block 302, control passes to block 306, and the queue age counters for all non-empty data sub-queues are incremented by one, representing that an additional ATM data cell has been output from the ATM switch since these data sub-queues have last been serviced.

Control then passes to block 308, where it is determined whether any of the data sub-queues, after having their queue age counters incremented by one, are in the dispatch-essential condition. That is, it is determined whether any of the data sub-queues have been waiting for a time period such that their age counter (representing the number of ATM data cells outputted from the ATM switch since that data sub-queue was last serviced) exceed their respective delay thresholds. If any of the age counters of the data sub-queues have exceeded their delay threshold, these data sub-queues will have their dispatch-essential flags raised. In addition, these data sub-queues will have their dispatch counters initialized to a value equal to a predetermined number of ATM cells that must be transmitted before the dispatch-essential flag is cleared.

If instead of having no dispatch-essential flags raised, at block 302, at least one data sub-queue has its dispatch-essential flag raised, then control will transfer to block 310, where an ATM cell is transmitted from the data sub-queue having the dispatch-essential flag raised. In the event that more than one data sub-queue has the dispatch-essential flag raised, then a data cell from the data sub-queue having the highest output ranking is dispatched to the output circuit. In addition, after transmitting an ATM cell, this data sub-queue will have its length dynamically shortened to equal the total length of the remaining ATM cells in the data sub-queue, again as discussed above in connection with FIG. 2 at block 206. Furthermore, the dispatch counter for this data sub-queue is decremented by one because one less ATM cell must be transmitted from the data sub-queue before the dispatch-essential flag is cleared. In addition, in this step, the queue age counter for this data sub-queue will be reset to zero.

It is to be understood from the foregoing that it is possible that many data sub-queues will have their dispatch-essential flags raised at the same time, meaning that all of these data sub-queues need immediate service. The highest output ranking of the dispatch-essential data sub-queues transmits an ATM cell first, as shown in block 310. In addition, it is to be understood that resetting the queue age counter to zero does not mean that the dispatch-essential flag for this data sub-queue is cleared. The dispatch-essential flag is cleared (as shown in block 314) only once the requisite predetermined number of ATM cells have been transmitted to the output circuit, as indicated by the dispatch counter.

Subsequent to dispatch of the data cell from a dispatch-essential data sub-queue, control transfers to block 312. In block 312, a determination is made whether the dispatch counter for the data sub-queue which just sent an ATM cell equals zero or whether this data sub-queue has become empty. If the answer to one or both of these queries is yes, then control transfers to block 314, where the dispatch-essential flag for this data sub-queue is cleared. It is to be understood that at the step in block 312, both of these conditions are tested (and logically OR'ed) since the dispatch-essential flag should be lowered if either (1) the data sub-queue has sent its required predetermined number of ATM cells, or (2) the data sub-queue is now empty, thus there being no need to have its dispatch-essential flag raised because it has no longer has any ATM cells to send.

If at block 312, neither one of the queries is true, then control will transfer to block 306, where all of the non-empty data sub-queues will have their queue age counter incremented by one, thus representing, as mentioned above, that an additional ATM data cell has been output from the ATM switch since these data sub-queues have last been serviced. Control then passes to block 308, as discussed above, where it is determined whether any of the data sub-queues, after having their queue age counters incremented by one, are in the dispatch-essential condition.

In a third preferred embodiment of the present invention, which operates as a refinement of the second preferred embodiment discussed above, a buffer management system and method is provided that allocates bandwidth more efficiently among different priority data sub-queues. In this embodiment, each data sub-queue is assigned an accumulation ratio as another service class parameter. When ATM cells from non-dispatch-essential data sub-queues are outputted, the highest output ranking data sub-queue having at least a minimum number of waiting cells (equal to the product of the accumulation ratio and the total number of cells in the buffer memory) has its ATM cells sent first. The accumulation ratios are set such that at least one non-empty data sub-queue will have at least the minimum number of waiting ATM cells.

An accumulation ratio is assigned for each of the data sub-queues, where data sub-queues having a higher priority will have a lower value for their assigned accumulation ratio. The accumulation ratio is directly representative of how much of the bandwidth should be allocated to each of the data sub-queues. A product of the accumulation ratio and the total number of ATM cells in the buffer memory provides an accumulation ratio threshold for each of the data sub-queues. If the accumulation ratio for a data sub-queue is represented as $T_a$ and the total number of ATM cells in the buffer memory is $C_{tot}$, then the accumulation ratio threshold for each data sub-queue is equal to $T_a \times C_{tot}$.

Figure 4:
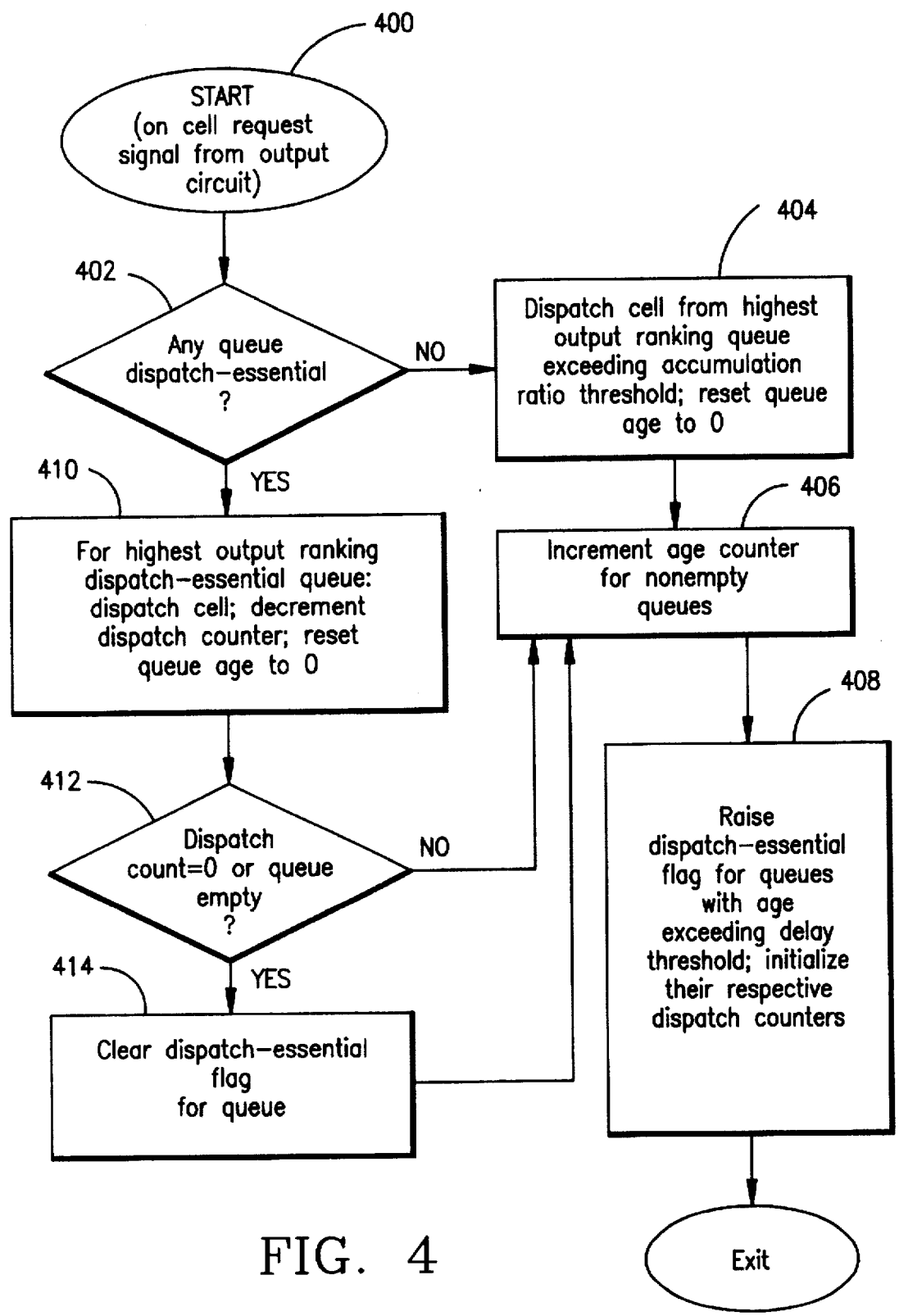
FIG. 4 illustrates a method for carrying out a third embodiment of the present invention.

FIG. 4 shows one possibility for carrying out this concept. Note that FIG. 4 is similar to FIG. 3 of the second embodiment, except that instead of block 304, the block for the present embodiment has been modified, as shown in block 404. Thus, upon ATM cell request from the output circuit (block 400), when no dispatch-essential flags are raised (block 402), control transfers to block 404. In this case, an ATM cell will be transmitted from the data sub-queue having the highest output ranking of all the data sub-queues that exceed their accumulation ratio thresholds. In the second embodiment, as explained above, an ATM cell from the highest output ranking data sub-queue of all the data sub-queues in the buffer memory was transmitted. In this embodiment, a very high output ranking data sub-queue not having the requisite minimum number of cells may be preempted by a lower output ranking queue which has the requisite minimum number of ATM cells. Of course, data sub-queues that have high output rankings will normally be assigned very low accumulation ratios. For these data sub-queues, even if they are storing a low number of ATM cells relative to other data sub-queues, their accumulation ratio thresholds will still be exceeded, and these data sub-queues will be output first.

As noted above, this method allows for lower output ranking data sub-queues having many ATM cells (but not yet having reached a dispatch-essential condition) to be able to transmit some of their ATM cells before higher output ranking data sub-queues that only have a few ATM cells to transmit. Thus, the output bandwidth becomes linked to traffic condition. It is also to be understood that for all $C_{tot}$ at least one data sub-queue will exceed its accumulation ratio thresholds so that no problem arises of certain data sub-queues having such a limited number of ATM cells so as not to be able to transmit their ATM cells because they cannot meet the accumulation ratio thresholds. Thus, this load balancing feature does not hinder the efficient operation of the transmission system in any manner.

In addition, even though FIG. 4 indicates that the accumulation ratios and accumulation ratio thresholds are only used when no data sub-queues are in dispatch-essential conditions, the accumulation ratios can be used in combination with the delay thresholds. If many data sub-queues are in their dispatch-essential condition, then situations may arise when some data sub-queues are waiting long periods of time to transmit ATM cells. This situation is analogous to selecting the highest output ranking data sub-queue to transmit an ATM cell when no dispatch-essential flags are raised. Therefore, just as the accumulation ratios were considered and used when no dispatch-essential flags were raised, these accumulation ratios can also be used to determine how much bandwidth to allocate among many data sub-queues whose dispatch-essential flags are raised.

In this case, instead of determining which data sub-queue, among those data sub-queues with their dispatch-essential flags raised, has the highest output ranking, a determination is made of the highest output ranking data sub-queue having both its dispatch-essential flag raised and has at least a number of ATM cells exceeding its accumulation ratio threshold. This provides the buffer management system with the ability to better allocate the total output bandwidth among the data sub-queues in the buffer memory.

Overall, while the second embodiment illustrates a refinement that assigns minimum bandwidth/age tolerance to the sub-queues, the third embodiment is a refinement that adjusts bandwidth allocation based on traffic condition such that an enormous surge of data in a low ranked queue is provided with greater attention.

Figure 5A:
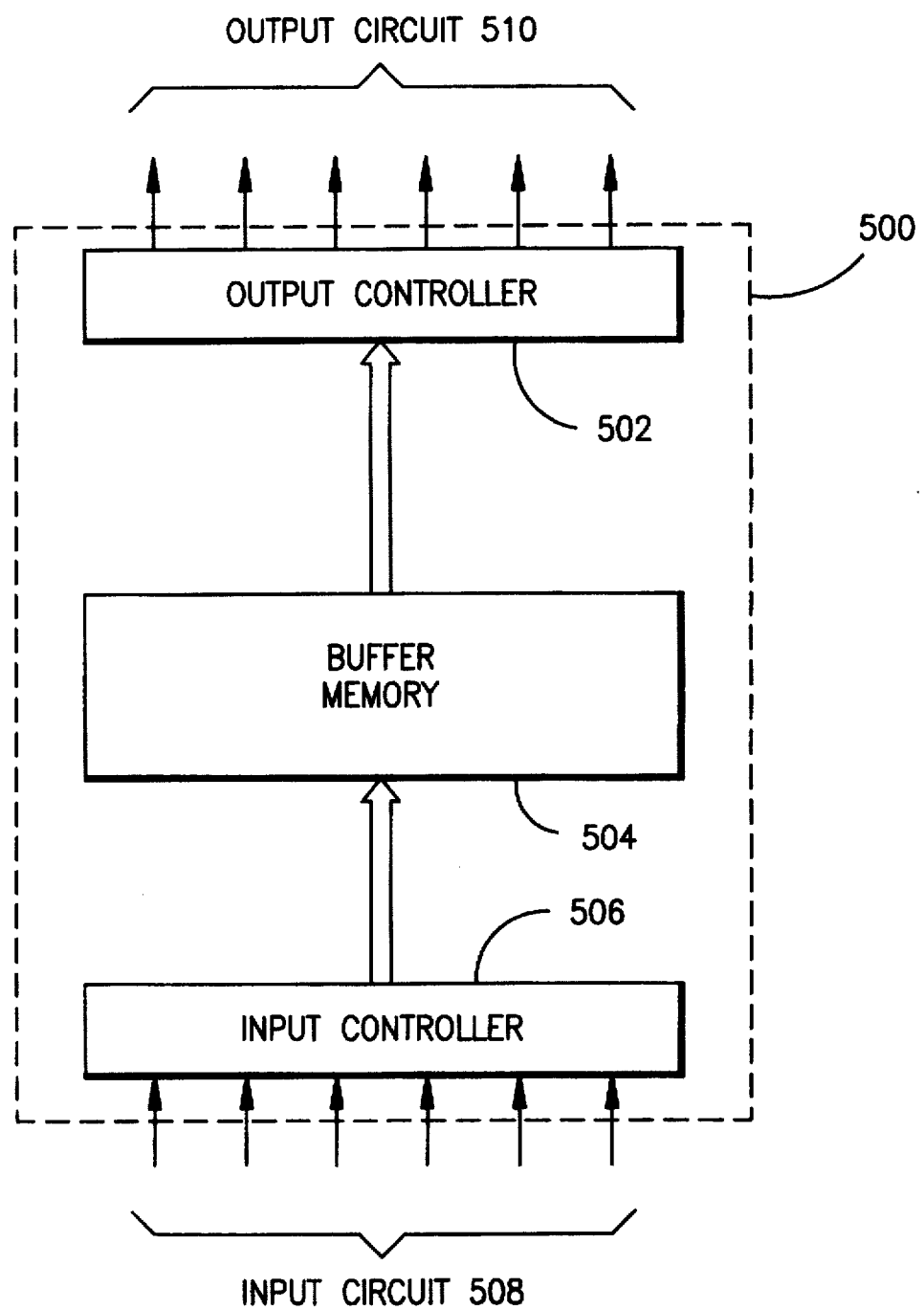
FIG. 5A illustrates an apparatus for carrying out the three embodiments of the present invention.
Figure 5B:
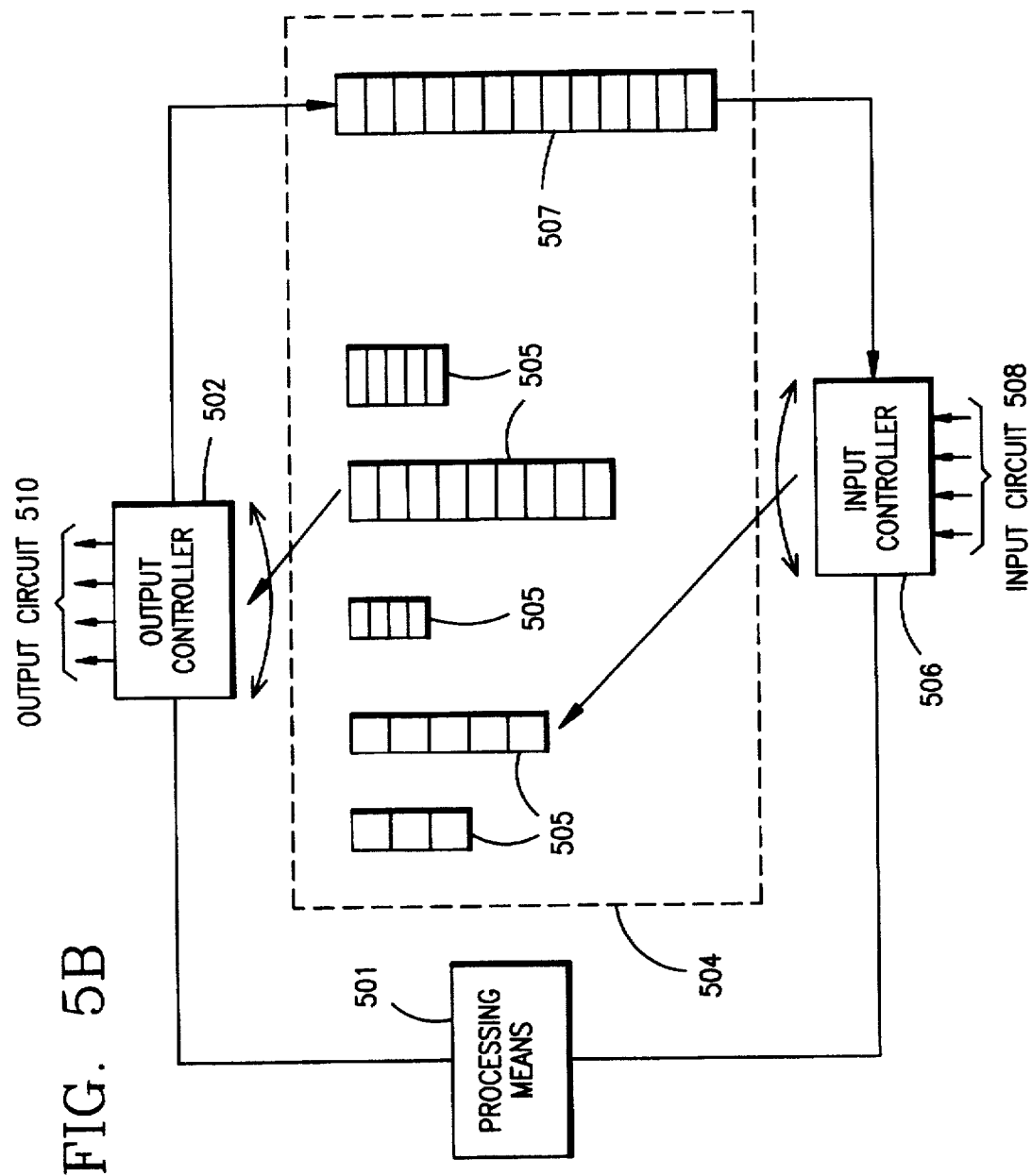
FIG. 5B illustrates in more detail the buffer memory shown in FIG. 5A.

FIG. 5 schematically illustrates one possible system in accordance with the present invention. The system of the present invention is generally shown at 500. Under control of processing means 501 connected with input controller 506 and output controller 502, buffer memory 504 holds data from an input circuit having one or more input ports 508 until the data is transmitted from the buffer memory 504 to the output circuit having a one or more output ports 510. The data (ATM cells or other fixed size digital data packets) is held in data sub-queues 505 in the buffer memory 504. An input controller 506 operates to input ATM cells into their specified data sub-queues 505 in the buffer memory 504 in accordance with the methods previously described. Similarly, an output controller 502 operates to request and transmit ATM cells from the buffer memory 504 to the output circuit 510 and further operates to purge the necessary ATM cells from the buffer memory 504 when it becomes full. The memory occupied by the last cell outputted is returned to the free memory pool 507.

We claim:

1. A method of processing a plurality of digital data packets that are received from at least one data input port, temporarily stored in a buffer memory, and intended for transmission through at least one data output port comprising the steps of:

receiving said digital data packets from said at least one data input port;

dividing said buffer memory for storing said digital data packets into a plurality of data sub-queues, each of said data sub-queues having a length that is dynamically determined in response to the receipt of said digital data packets by said data sub-queues and each of said data sub-queues having an assigned output ranking and purge ranking;

assigning an accumulation ratio for each of said plurality of data sub-queues;

calculating an accumulation ratio threshold for each of said plurality of data sub-queues equal to the product of said accumulation ratio for each of said plurality of data sub-queues and the total number of digital data packets stored in said buffer memory;

storing each of said digital data packets in a selected one of said data sub-queues; and transmitting each of said digital data packets from said plurality of data sub-queues to said at least one output port in accordance with said accumulation ratio threshold and said output ranking of each of said plurality of data sub-queues.

2. The method of claim 1 wherein each of said digital data packets is an ATM cell.

3. The method of claim 1 wherein at least one of said plurality of data sub-queues is given a higher output ranking than at least one other of said plurality of data sub-queues.

4. The method of claim 3 wherein each of said plurality of data sub-queues has an output ranking unique from said output ranking of each of said other data sub-queues.

5. The method of claim 4 further comprising the step of purging said digital data packets from said plurality of data sub-queues in accordance with said purge ranking of each of said data sub-queues.

6. The method of claim 5 wherein at least one of said plurality of data sub-queues is given a higher purge ranking than at least one other of said plurality of data sub-queues.

7. The method of claim 6 wherein each of said plurality of data sub-queues has a purge ranking unique from said purge ranking of each of said other data sub-queues.

8. The method of claim 3 further comprising the step of:
shortening the length of said data sub-queue from which said digital data packet was purged after said purging, whereby said shortening allows said data sub-queue from which said digital data packet was transmitted to equal the total length of said digital data packets remaining in said data sub-queue.

9. The method of claim 1 wherein said at least one data input port receives constant bit rate traffic.

10. The method of claim 1 wherein said at least one data input ports receives variable bit rate traffic.

11. The method of claim 1 wherein said at least one data input ports receives a combination of constant bit rate traffic and variable bit rate traffic.

12. The method of claim 1 further comprising the step of:
shortening said length of each of said plurality of data sub-queue from which said digital data packet was transmitted after said transmitting, whereby said shortening allows said data sub-queue from which said digital data packet was transmitted to equal the total length of said digital data packets remaining in said data sub-queue.

13. A method of processing a plurality of digital data packets that are received from at least one data input port, temporarily stored in a buffer memory, and intended for transmission through at least one data output port comprising the steps of:
receiving said digital data packets from said at least one data input port;
dividing said buffer memory for storing said digital data packets into a plurality of data sub-queues, each of said data sub-queues having a length that is dynamically determined in response to the receipt of said digital data packets by said data sub-queues and each of said data sub-queues having an assigned output ranking and purge ranking, an assigned delay threshold representing a minimum bandwidth for each of said plurality of data sub-queues, and a dispatch-essential flag and an age counter;
storing each of said digital data packets in a selected one of said data sub-queues;
incrementing said age counter for each of said plurality of data sub-queues when a digital data packet is dispatched from another of said plurality of data sub-queues;
setting said dispatch-essential flag for each of said plurality of data sub-queues when said age counter for said each of said plurality of data sub-queues exceeds said delay threshold for said each of said plurality of data sub-queues; and
outputting said digital data packets from each of said plurality of data sub-queues in accordance with said dispatch-essential flag and said output ranking of each of said plurality of data sub-queues.

14. The method of claim 13 wherein each of said plurality of data sub-queues has an dispatch counter representing a minimum number of digital data packets to be transmitted before clearing said dispatch-essential flag.

15. The method of claim 14 further comprising the step of decrementing said corresponding dispatch counter for each of said plurality of data sub-queues when a digital data packet is transmitted from each of said plurality of data sub-queues to said at least one output port.

16. The method of claim 15 further comprising the step of clearing said dispatch-essential flag for each of said plurality of data sub-queues when said dispatch counter indicates that said minimum number of digital data packets have been transmitted.

17. The method of claim 13 further comprising the step of clearing said dispatch-essential flag for each of said plurality of data sub-queues when each of said plurality of data sub-queues is empty.

18. A method of processing a plurality of digital data packets that are received from at least one data input port, temporarily stored in a buffer memory, and intended for transmission through at least one data output port comprising the steps of:
receiving said digital data packets form said at least one data input port;
dividing said buffer memory for storing said digital data packets into a plurality of data sub-queues, each of said data sub-queues having a length that is dynamically determined in response to the receipt of said digital data packets by said data sub-queues and each of said data sub-queues having an assigned output ranking and an assigned delay threshold, and a dispatch-essential flag and an age counter;
storing each of said digital data packets in a selected one of said data sub-queues;
incrementing said age counter for each of said plurality of data sub-queues when a digital data packet is dispatched from another of said plurality of data sub-queues;
setting said dispatch-essential flag for each of said plurality of data sub-queues when said age counter for said each of said plurality of data sub-queues exceeds said delay threshold for said each of said plurality of data sub-queues; and
outputting said digital data packets from each of said plurality of data sub-queues in accordance with said delay threshold and said output ranking of each of said plurality of data sub-queues.

19. The method of claim 18 wherein each of said plurality of data sub-queues has an dispatch counter representing a minimum number of digital data packets to be transmitted before clearing said dispatch-essential flag.

20. The method of claim 19 further comprising the step of decrementing said corresponding dispatch counter for each of said plurality of data sub-queues when a digital data packet is transmitted from each of said plurality of data sub-queues to said at least one output port.

21. The method of claim 20 further comprising the step of clearing said dispatch-essential flag for each of said plurality of data sub-queues when said dispatch counter indicates that said minimum number of digital data packets have been transmitted.

22. A method of processing a plurality of digital data packets that are received from at least one data input port, temporarily stored in a buffer memory, and intended for transmission through at least one data output port comprising the steps of:

receiving said digital data packets form said at least one data input port;

dividing said buffer memory for storing said digital data packets into a plurality of data sub-queues, each of said data sub-queues having a length that is dynamically determined in response to the receipt of said digital data packets by said data sub-queues and each of said data sub-queues having an assigned output ranking and an assigned accumulation ratio;

storing each of said digital data packets in a selected one of said data sub-queues calculating an accumulation ratio threshold for each of said plurality of data sub-queues equal to the product of said accumulation ratio for each of said plurality of data sub-queues and the total number of digital data packets stored in said buffer memory; and transmitting each of said digital data packets from said plurality of data sub-queues to said at least one output port in accordance with said accumulation ratio threshold and said output ranking of each of said plurality of data sub-queues.

23. An apparatus for processing a plurality of digital data packets that are received from at least one data input port, temporarily stored in a buffer memory, and intended for transmission through at least one data output port comprising the steps of:

input means for receiving said digital data packets from said at least one data input port;

processing means connected with said input means for dividing said buffer memory into a plurality of data sub-queues each having a length that is dynamically determined in response to the receipt of said digital data packets by said data sub-queues and each of said data sub-queues having an assigned output ranking and purge ranking, and an assigned delay threshold and accumulation ratio, said processing means further operating to store each of said digital data packets in a selected one of said data sub-queues.

24. The apparatus of claim 23 further comprising output means connected with said processing means for transmitting each of said digital data packets from said plurality of data sub-queues to said at least one output port in accordance with said output ranking of each of said data sub-queues.

25. The apparatus of claim 24 wherein said processing means further operates to purge said digital data packets from said plurality of data sub-queues in accordance with said purge ranking of each of said data sub-queues.

26. The apparatus of claim 23 wherein said processing means further operates to shorten said length of each of said plurality of data sub-queue from which said digital data packet was transmitted after said output means transmits said digital data packets, whereby said shortening allows said data sub-queue from which said digital data packet was transmitted to equal the total length of said digital data packets remaining in said data sub-queue.

27. A method of processing a plurality of digital data packets that are received from at least one data input port, temporarily stored in a buffer memory, and intended for transmission through at least one data output port comprising the steps of:

receiving said digital data packets from said at least one data input port;

dividing said buffer memory for storing said digital data packets into a plurality of data sub-queues, each of said data sub-queues having a length that is dynamically determined in response to the receipt of said digital data packets by said data sub-queues and each of said data sub-queues having an assigned output ranking and purge ranking, an assigned delay threshold representing a minimum bandwidth for each of said plurality of data sub-queues, and a dispatch-essential flag;

storing each of said digital data packets in a selected one of said data sub-queues;

determining a delay time indicative of the time lapsed since the digital data packet at the head of each of said plurality of data sub-queues was stored in said data sub-queue;

setting said dispatch-essential flag for each of said plurality of data sub-queues when said delay time for said each of said plurality of data sub-queues exceeds said delay threshold for said each of said plurality of data sub-queues; and outputting said digital data packets from each of said plurality of data sub-queues in accordance with said dispatch-essential flag and said output ranking of each of said plurality of data sub-queues.

28. The method of claim 27 wherein the next digital data packet is transmitted from the head of the highest output ranking data sub-queue with its dispatch-essential flag set.

29. An apparatus for processing a plurality of digital data packets that are received from at least one data input port, temporarily stored in a buffer memory, and intended for transmission through at least one data output port comprising the steps of:

input means for receiving said digital data packets from said at least one data input port;

processing means connected with said input means for dividing said buffer memory into a plurality of data sub-queues each having a length that is dynamically determined in response to the receipt of said digital data packets by said data sub-queues and each of said data sub-queues having an assigned output ranking and purge ranking, an assigned delay threshold representing a minimum bandwidth for each of said plurality of data sub-queues, a dispatch-essential flag; and an accumulation ratio, said processing means further operating to store each of said digital data packets in a selected one of said data sub-queues;

determining a delay time indicative of the time lapsed since the digital data packet at the head of each of said plurality of data sub-queues was stored in said data sub-queue;

setting said dispatch-essential flag for each of said plurality of data sub-queues when said delay time for said each of said plurality of data sub-queues exceeds said delay threshold for said each of said plurality of data sub-queues; and outputting said digital data packets from each of said plurality of data sub-queues in accordance with said dispatch-essential flag, said accumulation ratio, and said output ranking of each of said plurality of data sub-queues.

* * * * *